Patented May 15, 1945

2,375,749

UNITED STATES PATENT OFFICE 2,375,749

PROCESS FOR MANUFACTURING IRON-FREE MAGNESIUM SULPHATE FROM CERTAIN MINERALS

Charles A. Butt and Alvin Ozell Hallman, East Point, Ga., assignors to International Minerals & Chemical Corporation, a corporation of New York No Drawing. Application April 4, 1942,
Serial No. 437,686

4 Claims. (Cl. 23—128)

Our invention relates to improvements in a process for manufacturing iron-free magnesium sulphate from certain minerals and is of particular value in producing magnesium sulphate from a natural silicate of magnesia having a normally basic reaction, i. e. which is decomposable by acid, for example serpentine $$(Mg_3Si_2O_7.2H_2O)$$

or olivine $((MgFe)_2.SiO_4)$.

It is well known that minerals containing silicates of magnesia, for example serpentine or oliline, may be treated with sulphuric acid, whereupon the silicate is decomposed, with the formation of a solution of magnesium sulphate, which may be separated from the siliceous residue by filtration or decantation. However, since minerals of this character rarely come pure in nature, and particularly in the case of olivine, which always contains iron in combination, the iron present or a substantial part of it goes into solution and must be removed before one can obtain a reasonably pure solution of magnesium sulphate (Epsom salts). The removal of the soluble iron compounds from the solution has heretofore presented considerable difficulty.

The principal object of the present invention is to provide an economical, practical and efficient improved procedure for the removal of iron in a process which involves the production of magnesium sulphate by acidulating a mineral containing a silicate of magnesia.

General method

The rock or mineral, for example, serpentine or olivine, is first crushed and then ground to a point where all of the material will pass through a relatively fine screen, for example 40 or 60 mesh. The comminuted material is then treated with sulphuric acid, preferably in an amount which is somewhat less than is necessary to produce a complete reaction. In most cases, we can use sulphuric acid of a strength represented by 50 to 55° Bé., and the amount required will ordinarily be about the same in weight as the mineral which is being treated. However, the amount and strength of the acid may be varied to suit different materials and different conditions of treatment.

When the acid is added to the comminuted mineral, a strong reaction takes place, and usually, depending, of course, on the starting material, a cake will finally be formed upon or after completion of the reaction. This cake will be found to contain magnesium sulphate in the form of the salt, and a good deal of the iron present will be found to exist in soluble form, for example as sulphate of iron, which is quite soluble; and, if the cake were immediately leached out with water to extract the magnesium sulphate, the iron sulphate would also be extracted and would have to be subsequently removed in order to produce the pure salt of magnesium sulphate.

According to our improved procedure, the cake, instead of being immediately subjected to the water leaching step, is calcined at a temperature of between 300° C. and 900° C. in order to convert the soluble iron present in the cake into an insoluble form, for example, iron oxide. This calcining is effected under conditions which will not decompose or affect the solubility of the magnesium sulphate. After the calcining step, the calcined material may be treated with water so as to leach out the soluble magnesium sulphate as a relatively pure solution, while the iron oxides, being insoluble, are undissolved and can be separated from the solution if necessary by decantation or filtration.

Since we have found that it appears disadvantageous to have any considerable amount of free acid present in the material after the acidulating step, it is advisable to add less acid than is necessary to react completely all of the magnesia which is present in the raw material or, to put it another way, we include in the batch more of the raw material than is required to satisfy the reaction. Or, in place of using an excess of normally basic starting material (meaning material which will react with the acid), the basic condition may be obtained by including therein other well-known basic materials, for example, any cheap silicate, oxide, hydroxide or carbonate of the alkali or alkaline earth metals, for example calcium, magnesium or sodium. Where these extraneous basic materials are added, it may be advisable to add the same after the acidulation step, before calcining.

Specific Example #1

Raw material—serpentine rock having an analysis of 38.47% MgO, 45.77% SiO$_2$ and 2.92% Fe$_2$O$_3$.

To 100 parts of this material there were added 106 parts by weight of sulphuric acid of 50° Bé., at 60° F. The slurry thus formed was mixed for a few minutes and, in due course, the temperature of the mass began to rise. At the end of a short time, the mixture had set-up into a porous brittle mass.

After the acidulating step, the cake was then broken into small lumps such as would pass a screen of one-half inch mesh and calcined at a temperature of between 600° C. and 700° C. for about fifteen minutes in a rotary type kiln, preferably under oxidizing conditions.

After calcining, the material was then soaked in water, and the solution of magnesium sulphate was removed by filtration.

According to the above procedure, the amount of serpentine which was used was about 50% more than the theoretical quantity required for complete reaction, according to the amount of sulphuric acid used. See the following equation based upon 100 parts of serpentine containing MgO equivalent to 88.13% $Mg_3H_4Si_2O_9$ and 2.92% $Fe_2O_3$:

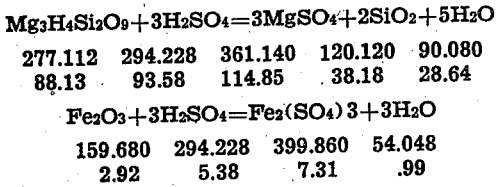

$$Mg_3H_4Si_2O_9 + 3H_2SO_4 = 3MgSO_4 + 2SiO_2 + 5H_2O$$

| 277.112 | 294.228 | 361.140 | 120.120 | 90.080 |
|---|---|---|---|---|
| 88.13 | 93.58 | 114.85 | 38.18 | 28.64 |

$$Fe_2O_3 + 3H_2SO_4 = Fe_2(SO_4)_3 + 3H_2O$$

| 159.680 | 294.228 | 399.860 | 54.048 |
|---|---|---|---|
| 2.92 | 5.38 | 7.31 | .99 |

In order to obtain a somewhat better yield, the excess of serpentine can be reduced from 50% to 25%. However, in that case it is advisable to prolong the calcining to about one-half hour.

*Specific Example #2*

Raw material—olivine (($MgFe)_2SiO_4$).

Perhaps due to the fact that olivine contains a large percentage of iron in chemical combination in the molecule, as distinguished from containing iron or an iron compound as an impurity, the procedure with olivine is not so simple as in case of serpentine. We find that the basic condition which seems to be necessary in order to get the full benefit from the calcining step cannot ordinarily be obtained with olivine by merely adding an excess of the starting raw material, as in the case of serpentine. To create this basic condition in the case of olivine, it appears to be necessary to add an extraneous basic material to the batch subsequent to the acidulating step, prior to calcination. The process in the case of olivine is as follows:

The olivine was ground up to a point where 94.0% would pass a 40 mesh sieve, 85.4% would pass a 60 mesh sieve, 73.1% would pass an 80 mesh sieve, and 67.5% would pass a 100 mesh sieve. 100 parts of this ground olivine were mixed with 10.5 parts of water and 115 parts of 60° Bé. sulphuric acid.

Considerable heat was evolved during the aforesaid acidulating step, and the material became dry and granular within a few minutes. The analysis of this material was as follows:

|  | Per cent |
|---|---|
| Moisture at 105° C | 5.28 |
| Total MgO | 22.49 |
| Water-soluble MgO | 15.99 |
| Water-soluble $R_2O_3$ | 3.25 |
| Free acid ($H_2SO_4$) | 2.40 |

The above mixture was then ground to pass a 40 mesh screen and to 100 parts by weight were added 6 parts of sodium hydroxide dissolved in 25 parts of water. This mixture at first became damp and clingy, but as hydration occurred, it assumed a dry granular condition while stirring. The mixture alkalized as above described was then calcined at 800° C. for about fifteen minutes in a rotary type kiln, preferably under oxidizing conditions. After calcining, the material, as in the case of the serpentine example, was then soaked in water and the solution of magnesium sulphate was removed by filtration.

In place of using sodium hydroxide, magnesium oxide can be used as an alkalizing agent and in the same proportion as in the case of sodium hydroxide. Preferably, where magnesium oxide is used as an alkalizing agent, the dry magnesium oxide is mixed with ground up acidulated olivine and then the water is added.

When the above procedure is followed, using either sodium hydroxide or magnesium oxide, the calcined material is found to contain no water soluble iron.

The invention manifestly is capable of considerable variation in order to suit different minerals which are to be used as raw materials and in order to satisfy different conditions. The scope of the invention should be determined by reference to the appended claims.

We claim:

1. The improvement in the art of producing magnesium sulphate from a mineral which contains a major amount of serpentine and a minor amount of an iron compound, which comprises reacting said mineral with an amount of sulphuric acid which is sufficient only to form sulphates with the iron and the magnesium of only from 67% to 80% of the serpentine, calcining the reaction product so as to convert any iron compounds which are normally soluble in water into materials which are insoluble in water without impairing the water solubility of the magnesium sulphate, and then leaching out the magnesium sulphate with water.

2. The improvement in the art of manufacturing magnesium sulphate, which comprises reacting sulphuric acid with a mineral containing a magnesium silicate, incorporating with the batch an amount of basic material having a normally basic reaction and which material, together with the magnesium silicate in the batch, is in sufficient amount so that the batch contains at least 25% more than the stoichiometrical equivalent of the sulphuric acid in the conversion reaction, and is selected from the group of materials which consists of the silicates, oxides, hydroxides and carbonates of the alkali and alkaline earth metals and of magnesium, calcining the batch at a temperature high enough to convert any water soluble iron compounds present into oxides, and then leaching out the magnesium sulphate with water.

3. The improvement in the art of producing magnesium sulphate from a mineral which contains a minor amount of iron and a major amount of a magnesium silicate, which has a normally basic reaction and which is decomposable by acid, which comprises reacting said mineral with sulphuric acid so as to convert said magnesium silicate into magnesium sulphate obtaining a basic condition in the reacted batch by including in the batch an amount of material having a normally basic reaction which together with the magnesium silicate in the batch, is substantially more than the stoichiometrical equivalent of the sulphuric acid in the conversion reaction, calcining the product so as to convert any iron compounds into materials which are insoluble in water without impairing the water solubility of the magnesium sulphate, and then leaching out the magnesium sulphate with water.

4. The improvement in the art of producing magnesium sulphate from a mineral which contains a major amount of olivine, which comprises reacting said mineral with an amount of sulphuric acid which is not more than sufficient to form sulphates with the iron and the magnesium contained in said mineral, adding to the reacted mineral a material selected from the group of materials which consists of the silicates, oxides, hydroxides and carbonates of the alkali and alkaline earth metals, and in an amount which represents at least 25% of the stoichiometrical equivalent of the sulphuric acid used in the conversion reaction, then calcining the batch at a temperature high enough to convert any water-soluble iron compounds present into oxides, and then leaching out the magnesium sulphate with water.

CHARLES A. BUTT.
ALVIN OZELL HALLMAN.